(12) United States Patent
McLean (10) Patent No.: US 12,399,848 B2
(45) Date of Patent: Aug. 26, 2025

(54) DISTRIBUTING VIRTUAL CHANNEL REQUESTS WITH MULTIPLE MEMORY MODULES

(71) Applicant: ATI Technologies ULC, Markham (CA)

(72) Inventor: Michael E. McLean, Bolton (CA)

(73) Assignee: ATI Technologies ULC, Markham (CA)

( * ) Notice: Subject to any disclaimer, the term of this patent is extended or adjusted under 35 U.S.C. 154(b) by 58 days.

(21) Appl. No.: 18/204,317

(22) Filed: May 31, 2023

(65) Prior Publication Data

US 2024/0403237 A1    Dec. 5, 2024

(51) Int. Cl.
G06F 13/16    (2006.01)

(52) U.S. Cl.
CPC ...... *G06F 13/1673* (2013.01); *G06F 13/1621* (2013.01); *G06F 13/1657* (2013.01)

(58) Field of Classification Search
CPC ............. G06F 13/1621; G06F 13/1657; G06F 13/1673
See application file for complete search history.

(56) References Cited

U.S. PATENT DOCUMENTS

| | | | | |
|---|---|---|---|---|
| 2008/0016254 A1* | 1/2008 | Kruger | ................ | G06F 13/1657 709/251 |
| 2008/0228896 A1* | 9/2008 | Krig | ...................... | G06F 13/385 709/212 |
| 2015/0178123 A1 | 6/2015 | Doshi et al. | | |
| 2016/0188499 A1* | 6/2016 | Nagarajan | ........... | G06F 13/1663 711/150 |
| 2018/0173649 A1* | 6/2018 | Kyrychynskyi | ...... | G06F 13/161 |
| 2020/0081652 A1* | 3/2020 | Nukala | ................. | G06F 3/0659 |
| 2020/0410323 A1 | 12/2020 | Vinod | | |

(Continued)

FOREIGN PATENT DOCUMENTS

WO    2024246618 A1    12/2024

OTHER PUBLICATIONS

J. Diemer, J. Rox, M. Negrean, S. Stein and R. Ernst, "Real-time communication analysis for networks with two-stage arbitration," 2011 Proceedings of the Ninth ACM International Conference on Embedded Software (EMSOFT), Taipei, Taiwan, 2011, pp. 243-252, doi: 10.1145/2038642.2038680. (Year: 2011).*

(Continued)

*Primary Examiner* — Eric T Oberly
(74) *Attorney, Agent, or Firm* — FIG. 1 Patents (57) ABSTRACT

A distribution system receives data access requests associated with at least two virtual channels over at least two physical data communication channels. The requests are distributed into at least two sequencers of the distribution system based on a virtual channel associated with each request. The distribution system includes at least two memory modules—one for each of the at least two physical data communication channels. Requests stored in the sequencers are written to the memory modules according to a pattern that assigns sequential requests associated with a common virtual channel to a sequential ordering of the memory modules. The requests are then granted by an arbiter of the distribution system by retrieving requests associated with a common virtual channel from the memory modules using the sequential ordering of the memory modules.

20 Claims, 6 Drawing Sheets

(56) References Cited

U.S. PATENT DOCUMENTS

2023/0063676 A1* 3/2023 Lahav .................... G06F 9/52
2024/0095194 A1* 3/2024 Keil ................. G06F 13/1678

OTHER PUBLICATIONS

Jaekyu Lee, Si Li, Hyesoon Kim, and Sudhakar Yalamanchili. 2013. Adaptive virtual channel partitioning for network-on-chip in heterogeneous architectures. ACM Trans. Des. Autom. Electron. Syst. 18, 4, Article 48 (Oct. 2013), 28 pages. https://doi.org/10.1145/2504906 (Year: 2013).*
PCT/US2024/052861, "International Search Report and Written Opinion", International Application No. PCT/US2024/052861, Apr. 24, 2024, 10 pages.

* cited by examiner

Input Pattern 302

Cycle 0: Bus 202 receives VC0(1); Bus 204 receives VC1(1)
Cycle 1: Bus 202 receives VC2(1); Bus 204 receives VC3(1)
Cycle 2: Bus 202 receives VC0(2); Bus 204 receives VC1(2)
Cycle 3: Bus 202 receives VC2(2); Bus 204 receives VC3(2)

⋮

Distributor Operations 304

Cycle 0: IB 214 writes VC0(1) to Buffer 222; IB 216 writes VC1(1) to Buffer 224
Cycle 1: IB 214 writes VC2(1) to Buffer 222; IB 216 writes VC3(1) to Buffer 224
Cycle 2: IB 218 writes VC0(2) to Buffer 228; IB 220 writes VC1(2) to Buffer 230
Cycle 3: IB 218 writes VC2(2) to Buffer 228; IB 220 writes VC3(2) to Buffer 230

⋮

SRAM Writes 306

Cycle 0: SRAM 234: None; SRAM 236: None
Cycle 1: SRAM 234: Write VC0(1); SRAM 236: None
Cycle 2: SRAM 234: Write VC1(1); SRAM 236: None
Cycle 3: SRAM 234: Write VC2(1); SRAM 236: Write VC0(2)
Cycle 4: SRAM 234: Write VC3(1); SRAM 236: Write VC1(2)
Cycle 5: SRAM 234: Write VC0(3); SRAM 236: Write VC2(2)
Cycle 6: SRAM 234: Write VC1(3); SRAM 236: Write VC3(2)

Input Pattern 402

Cycle 0: Bus 202 receives VC0(1); Bus 204 receives VC0(2)
Cycle 1: Bus 202 receives VC1(1); Bus 204 receives VC1(2)
Cycle 2: Bus 202 receives VC2(1); Bus 204 receives VC2(2)
Cycle 3: Bus 202 receives VC3(1); Bus 204 receives VC3(2)

⋮

Distributor Operations 404

Cycle 0: IB 214 writes VC0(1) to Buffer 222; IB 218 writes VC0(2) to Buffer 228
Cycle 1: IB 216 writes VC1(1) to Buffer 224; IB 220 writes VC1(2) to Buffer 230
Cycle 2: IB 214 writes VC2(1) to Buffer 222; IB 218 writes VC2(2) to Buffer 228
Cycle 3: IB 216 writes VC3(1) to Buffer 224; IB 220 writes VC3(2) to Buffer 230

⋮

SRAM Writes 406

Cycle 0: SRAM 234: None; SRAM 236: None
Cycle 1: SRAM 234: Write VC0(1); SRAM 236: Write VC0(2)
Cycle 2: SRAM 234: Write VC1(1); SRAM 236: Write VC1(2)
Cycle 3: SRAM 234: Write VC2(1); SRAM 236: Write VC2(2)
Cycle 4: SRAM 234: Write VC3(1); SRAM 236: Write VC3(2)

DISTRIBUTING VIRTUAL CHANNEL REQUESTS WITH MULTIPLE MEMORY MODULES

BACKGROUND

Computer technology is regularly advancing, resulting in faster computers. One such area of advancement is hardware communication systems that transfer data between components of a computer or between different computers. As new communication systems are developed, the rate at which data is transferred via the communication systems continues to increase. As a corollary to this increase in available bandwidth, fast and reliable data communication systems are critical in enabling computers to perform more complex tasks and handle larger data sets.

DETAILED DESCRIPTION

With advances in computing device technology, computer architectures are configured such that multiple different components attempt to access data maintained (e.g., stored) in shared resources, such as volatile memory (e.g., dynamic random-access memory (DRAM)), nonvolatile memory (e.g., Flash memory or phase-change memory (PCM)), hardware devices (e.g., hard disks, network cards, graphics cards, compute express link (CXL) devices, or hardware accelerators), and so forth. To accommodate these increasing demands, processors are constantly tasked with deciding which computing device components will be granted access at any given point in time. As computing communication speeds continue to increase and as systems are expanded to accommodate additional components, it becomes increasingly difficult to develop logic that can properly allocate these requests while keeping pace with a rate at which the requests are received.

To avoid negatively impacting computing system performance, techniques have been developed to determine, for each system cycle (e.g., each central processing unit (CPU) cycle), which pending requests from system components should be granted access to a destination. As described herein, a system cycle, or clock cycle, refers to an amount of time between two pulses of an oscillator (e.g., a CPU oscillator crystal). One such technique for managing requests involves a credited protocol (e.g., a credit/debit protocol, a credit interconnect protocol, etc.), which refers to a standardized protocol in which a computing device component that receives requests (e.g., to read and/or write data from a computing resource) informs requesting components as to how much storage space is available to handle requests in the form of credits. For instance, in a credited protocol, before a CPU core can request to access data from a storage location, the CPU core must first receive at least one credit which indicates that the storage location, or an intermediary memory module between the CPU core and the storage location, has sufficient storage space to handle the request without dropping the request. As a specific example, in a scenario where the storage location has a buffer with 20 available slots, it will send the CPU core 20 credits to indicate that there is enough storage space to handle 20 requests from the CPU core.

As computing device technology continues to improve, the communication bandwidth needed to transfer data between different computing components has also increased. Some conventional system architectures include only one communication interface (e.g., a data bus) between two different computing components (e.g., a request sending location and a request receiving location), and are thus limited to communicating a single request per system cycle. Other conventional system architectures include additional communication interfaces between a request sending location and a request receiving location, such as double-pumped or quadruple-pumped interfaces. Double-pumped interfaces refer to system architectures that include two communication interfaces linking different computing components and are thus able to handle two requests per system cycle. In double-pumped system configurations, there exists a strict implied order between the two communication interfaces (e.g., data received via one communication channel is considered to be received "earlier" than data received via the other communication channel, even when the data is received via the different communication channels during a single clock cycle. Similarly, quadruple-pumped interfaces refer to system architectures that include four communication interfaces linking sending and receiving components, with a strict implied order for the four communication interfaces, and are thus able to handle four requests per system cycle.

In addition to system architectures that include multiple physical communication channels between sending and receiving device components, some system architectures leverage virtual channels to reduce latency and improve data transfer efficiency. Virtual channels refer to a logical concept that allows for multiple, independent, data streams (e.g., different types of data traffic that are orthogonal to one another) to be communicated over a common physical interface. Assigning different types of data traffic (e.g., requests to access data) to different virtual channels ensures that one type of data traffic will not be assigned an ordering relative to a different type of traffic, despite system hardware characteristics that may otherwise imply an ordering or dependency of different traffic types on one another. For instance, conventional system architectures that do not leverage virtual channels often imply that request communicated over a common physical communication interface (e.g., a hardware data bus) are related to one another. To do so, requests are sent by a requesting component along with a virtual channel indicator (e.g., one or more bits that identify a virtual channel with which the request is associated).

With multiple physical communication channels and multiple virtual channels, system architectures often implement a memory module as an intermediary component between a request sending component and a request receiving component, where the memory module is used to temporarily store credited protocol requests. One such example of a memory module is static random-access memory (SRAM) storage. SRAMs, however, commonly include a maximum of one read interface and one write interface, which causes a problem with multiple communication channel systems (e.g., double-pumped or quadruple-pumped systems), as the single read port and single write port cannot accommodate multiple transactions in a single cycle. Other example memory modules that serve as the intermediary component in system architectures that follow credited protocols include DRAM, synchronous dynamic random-access memory (SDRAM), and flash memory, and so forth.

As alternatives to single read port and single write port memory modules, some system architectures include intermediary memory modules that include multiple read ports and multiple write ports (e.g., latch arrays, flop arrays, and so forth), which are able to accommodate request in multiple communication channel systems (e.g., double-pumped or quadruple-pumped systems). However, a drawback of these multiple read port/multiple write port memory modules is that they are not area efficient when scaled to large sizes (e.g., the physical size of latch arrays and flop arrays occupies too much space on a silicon chip (e.g., square millimeters/microns) and does not satisfy small chip design constraints. Consequently, system size design constraints often force use of SRAMs or other intermediary memory modules limited to a single read port and a single write port.

Given such system design constraints, system architectures are designed to include multiple single read port/single write port memory modules, such as one SRAM for each physical communication channel between a requesting component and a destination component to which a request is sent. For example, a double-pumped system includes two SRAMs and a quadruple-pumped system includes four SRAMs to temporarily store requests. However, such system architectures with a memory module (e.g., SRAM) dedicated to each physical communication channel (e.g., data bus) encounter problems in credited protocols that service requests associated with multiple virtual channels.

For instance, consider an example scenario where a double-pumped system interface releases 20 credits, implying that 20 requests can be sent over ten clock cycles, with one request transmitted via each of the two physical busses during each clock cycle. In this example scenario, if the requests are associated with different virtual channels, in order for the virtual channels to be distributed in a manner that does not become fragmented, conventional system architectures require including full-depth memory modules (e.g., two SRAMs that each include 20 slots). This full-depth memory module requirement is necessitated so that there is guaranteed space to store different virtual channel requests, regardless of an order in which the requests are received.

As an example of how conventional system architectures result in fragmented (e.g., orphaned, dropped, etc.) virtual channel requests, consider a situation where a double-pumped system receives, during each system cycle, a first virtual channel request on a first data bus and a second virtual channel request on a second data bus. In this example situation, the system architecture includes a first SRAM that stores requests received via the first data bus (e.g., requests associated with the first virtual channel) and a second SRAM that stores requests received via the second data bus (e.g., requests associated with the second virtual channel). Such a configuration results in requests associated with one virtual channel preventing requests associated with the other virtual channel from making forward progress. For instance, downstream constraints that prevent the first SRAM from releasing requests associated with the first virtual channel would result in the first SRAM becoming full and unable to store further requests while the second SRAM is drained. Such a data communication bottleneck renders the first data bus inoperable until the first SRAM can be emptied, which creates latency, results in dropped requests associated with the first virtual channel, and overall degrades system performance.

To address these problems facing conventional computing system architectures, distributing requests associated with different virtual channels among multiple memory modules is described. In implementations, a computer architecture includes a distribution system that serves as an intermediary for temporarily storing data requests (e.g., read/write requests) before granting access to a destination storing data associated with a request. The distribution system includes a distributor (e.g., a circuit programmed with logic) that redistributes requests associated with different virtual channels into different memory modules (e.g., different SRAMs) of the distribution system, independent of (e.g., without respect to) a physical bus on which a request was received. In this manner, the distributor ensures that each memory module stores a uniform virtual channel distribution of requests.

To do so, the distribution system includes a sequencer (e.g., a first-in, first-out (FIFO) sequencer) for each memory module that buffers requests before writing requests to the memory module. Given an input pattern of requests (e.g., a pattern in which requests associated with different channels are received at the distribution system over multiple communication channels), the distributor forwards an initial request associated with a given virtual channel to a first sequencer. Upon receiving a subsequent request associated with the given virtual channel, the distributor redirects the request to a second sequencer, repeating this process by directing virtual channel requests to different sequencers in a round robin format. Each sequencer includes a multiplexer, which is a logical block that merges multiple sources into a single target (e.g., the memory module connected to the respective sequencer). The multiplexer is programmed with logic to select which buffer within the sequencer should be selected to push stored data into the memory module (e.g., the SRAM) linked to the sequencer.

Each memory module is further configured to include a linked list for each virtual channel, such that different requests associated with a given virtual channel in the memory module are ensured to be serviced in a proper order (e.g., a sequential order in which the virtual channel requests were received at the distribution system). For instance, in an example scenario where a memory module stores requests associated with three different virtual channels, the memory module includes three linked lists—one for each of the three different virtual channels. The distribution system further includes a virtual channel arbiter and crossover multiplexer, which is a logical block that services requests associated with a given virtual channel in a defined pattern. The defined pattern ensures that requests associated with the given virtual channel are retrieved from different memory modules of the distribution system in a proper sequence for the virtual channel.

Advantageously, the distribution system optimizes computer system efficiency by not requiring full-depth memory modules and enabling advertisement of an entirety of the distribution system's available storage in a credited protocol. Further, the balanced distribution of virtual channels across different memory modules of the distribution system enables even utilization of downstream communication channels (e.g., data busses connecting the distribution system to storage locations storing requested data), independent of an order in which virtual channel requests are received at the distribution system or of downstream system bottlenecks that prevent release of certain virtual channel requests.

In some aspects, the techniques described herein relate to a system including at least two physical communication channels, at least two memory modules, a distributor to receive a plurality of requests, that are associated with multiple different virtual channels, via the at least two physical communication channels, at least two sequencers to buffer the plurality of requests before writing the plurality of requests to the at least two memory modules, and an arbiter to grant the plurality of requests according to a defined pattern.

In some aspects, the techniques described herein relate to a system, wherein each of the at least two memory modules include a single read port and a single write port.

In some aspects, the techniques described herein relate to a system, wherein the at least two physical communication channels connect the distributor to a source from which the plurality of requests are received.

In some aspects, the techniques described herein relate to a system, wherein each of the at least two sequencers is linked to a corresponding one of the at least two memory modules.

In some aspects, the techniques described herein relate to a system, wherein each sequencer of the at least two sequencers includes at least two buffers, wherein each of the at least two buffers corresponds to a respective one of the at least two physical communication channels.

In some aspects, the techniques described herein relate to a system, wherein each sequencer of the at least two sequencers includes a multiplexer that writes requests from the at least two buffers of the sequencer to a memory module of the at least two memory modules that is linked to the sequencer.

In some aspects, the techniques described herein relate to a system, wherein the distributor is configured to assign sequential requests of the plurality of requests that are associated with a common virtual channel of the multiple different virtual channels to different ones of the at least two sequencers based on a defined pattern.

In some aspects, the techniques described herein relate to a system, wherein the distributor is configured to receive one of the plurality of requests via each of the at least two physical communication channels during a clock cycle of the system.

In some aspects, the techniques described herein relate to a system, wherein the arbiter is further configured to release a credit to a source from which the plurality of requests are received in response to granting each of the plurality of requests.

In some aspects, the techniques described herein relate to a system, wherein the plurality of requests are received responsive to the system informing a source from which the plurality of requests are received as to a number of available credits, wherein the number of available credits is equal to a number of requests that fill the at least two memory modules.

In some aspects, the techniques described herein relate to a system, wherein each of the at least two memory modules include a linked list, for each of the multiple different virtual channels, that describes an order in which requests associated with a corresponding one of the multiple different virtual channels were written to the memory module.

In some aspects, the techniques described herein relate to a method including receiving a plurality of requests associated with at least two virtual channels, distributing the plurality of requests into at least two sequencers of a distribution system by assigning each of the plurality of requests to one of the at least two sequencers based a virtual channel of the at least two virtual channels that is associated with the request, writing requests stored in the at least two sequencers to at least two memory modules, where each of the at least two sequencers is connected to a corresponding one of the at least two memory modules, maintaining, at each of the at least two memory modules, a plurality of linked lists that includes a linked list for each of the at least two virtual channels, and granting the plurality of requests using the at least two memory modules and the plurality of linked lists of each of the at least two memory modules.

In some aspects, the techniques described herein relate to a method, wherein each of the at least two memory modules includes a single read port and a single write port.

In some aspects, the techniques described herein relate to a method, wherein distributing the plurality of requests into the at least two sequencers includes alternating buffering of requests that are associated with a same virtual channel of the at least two virtual channels among different ones of the at least two sequencers based on a pattern.

In some aspects, the techniques described herein relate to a method, wherein the pattern specifies an ordering of the at least two sequencers and causes distribution of sequential ones of the requests that are associated with the same virtual channel based on the ordering in a round robin format.

In some aspects, the techniques described herein relate to a method, wherein each linked list of the plurality of linked lists defines an ordering in which requests of the plurality of requests, that are associated with a virtual channel identified by the linked list, were written to a corresponding one of the at least two memory modules.

In some aspects, the techniques described herein relate to a device including a distributor configured to receive a request associated with a virtual channel, identify that a prior request associated with the virtual channel has been granted, identify a counter value maintained for the virtual channel, grant the request using data stored in a memory module identified by the counter value, create an adjusted counter value by changing the counter value responsive to granting the request, receive an additional request associated with the virtual channel, and grant the additional request using data stored in a different memory module identified based on the adjusted counter value.

In some aspects, the techniques described herein relate to a device, wherein the memory module and the different memory module each include a single read port and a single write port.

In some aspects, the techniques described herein relate to a device, wherein the distributor is configured to assign the request and the different request to a sequencer linked to the memory module or a different sequencer linked to the different memory module based on a defined pattern.

In some aspects, the techniques described herein relate to a device, wherein the distributor receives the request and the additional request during a single clock cycle of the device.

Figure 1:
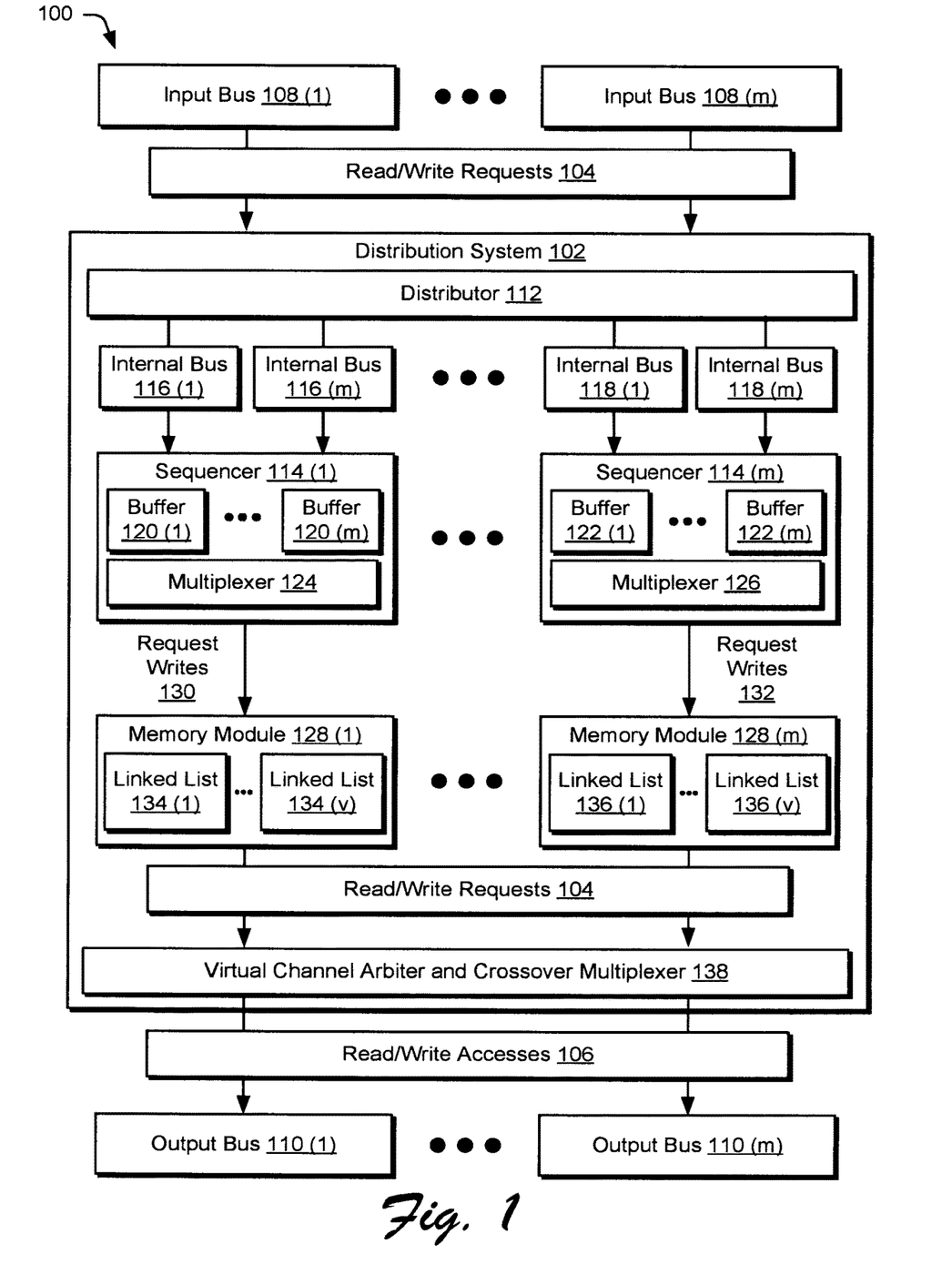
FIG. 1 is an illustration of an example distribution system that is operable to employ the virtual channel request distribution techniques described herein.

FIG. 1 is an illustration of a digital medium environment 100 that includes a distribution system 102 configured to employ the virtual channel request distribution techniques described herein. The distribution system 102 is configured to manage requests for access to one or more destinations, such as to receive read and write requests 104 from one or more sources and grant at least some of the read and write requests 104 access to the destination as read and write accesses 106. Individual requests of the read and write request 104 are requests to read data from at least one data storage location, requests to write data to one or more data storage locations, or combinations thereof. Accordingly, as described herein, read and write requests 104 are representative of any distribution of read requestions, write requests, and/or read-write requests for data stored at one or more destinations. As part of facilitating access to the destination, the distribution system 102 is further configured to return any appropriate data from the destination to a requesting source (e.g., the requested data for a write access).

In implementations, the digital medium environment 100 represents a credited protocol computing environment, where the distribution system 102 first provides a source from which the read and write requests 104 are received with a number of credits that indicate an amount of requests the distribution system 102 is capable of handling. Advantageously, the techniques described herein enable that number of credits to represent a number of requests that fill memory modules of the distribution system 102, as described in further detail below. In credited protocol implementations, the distribution system 102 is further configured to release a credit to a source from which the read and write requests 104 whenever a read and write access 106 is granted.

In implementations, the distribution system 102 receives the read and write requests 104 from a variety of sources, such as a hard disk, a network card, a processing device component linked to the distribution system 102 via a universal serial bus (USB), a graphics card, a CXL device, an accelerator, one or more input/output devices (e.g., a keyboard or a mouse), and so forth. The destination to which the read and write accesses 106 are granted is representative of a variety of destinations, such as physical memory (e.g., DRAM, Flash memory, PCM, and so forth), a hard disk, a network card, a graphics card, a CXL device, a hardware accelerator, and so forth.

In one or more implementations, the distribution system 102 is implemented in software. For example, the distribution system 102 is part of an operating system of a computing device or software of a computing device component configured to facilitate communication between a requesting source and a destination (e.g., a Peripheral Component Interconnect (PCI) bus). Additionally or alternatively, the distribution system 102 is implemented in hardware. For example, the distribution system 102 is implemented in an integrated circuit of a computing device component configured to facilitate communication between a requesting source and a destination, such as an integrated circuit of a PCI bus. By way of another example, the distribution system 102 resides in the same device package or integrated circuit as the destination to which the read and write accesses 106 are granted.

Thus, the distribution system 102 is implementable in a smartphone or other wireless phone, a tablet or phablet computer, a notebook computer (e.g., netbook or ultrabook), a laptop computer, a desktop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television), an Internet of Things (IoT) device, an automotive computer, a server system, and so forth.

In the illustrated example of FIG. 1, the distribution system 102 is depicted as receiving the read and write requests 104 via multiple physical communication channels, individually represented as input bus 108. Specifically, the distribution system 102 receives the read and write requests 104 via m different input busses 108, where m represents any integer greater than or equal to two. In a similar manner, the distribution system 102 is depicted as granting the read and write accesses 106 via multiple physical communication channels, individually represented as output bus 110. Specifically, the distribution system 102 grants the read and write accesses 106 via m different output busses, where each output bus 110 represents a continuation of a corresponding input bus 108. Although illustrated in the digital medium environment 100 as being busses, the input busses 108 and the output buses 110 are representative of any suitable type of physical data communication interface, such as busses (e.g., a data bus), interconnects, traces, planes, combinations thereof, and so forth.

The distribution system 102 further includes multiple sequencers, one for each of the input busses 108, individually represented in FIG. 1 as sequencer 114. In this manner, the distribution system 102 includes m different sequencers 114. In order to distribute the read and write requests 104 among the different sequencers 114, the distribution system 102 includes n different internal busses, where n=m². In this manner, the distribution system 102 includes one internal bus for each input bus 108, per sequencer 114, such that the distributor 112 is enabled to send all read and write requests 104 received during a given clock cycle to a single sequencer 114. The distributor 112 is representative of virtual channel allocation logic that causes sending of sequential traffic (e.g., sequential ones of the read and write requests 104 associated with a given virtual channel) to a different sequencer 114.

Although not depicted in the illustrated example of FIG. 1, each of the read and write requests 104 is individually associated with one of multiple different virtual channels (e.g., one of at least two different virtual channels). In implementations, each of the read and write requests 104 include bits that indicate a virtual channel with which the request is associated. Examples of the distribution system 102 distributing read and write requests 104 associated with different virtual channels among different sequencer 114 are described in further detail below with respect to FIGS. 3 and 4.

With respect to the illustrated example of FIG. 1, the distributor 112 is connected to each sequencer 114 using m different internal busses. For instance, the distributor 112 is connected to sequencer 114(1) via m different internal busses 116. Similarly, the distributor 112 is connected to sequencer 114(m) via m different internal busses 118. Internal bus 116(1) represents a communication pathway for the distributor 112 to distribute requests received via input bus 108(1) to sequencer 114(1). Internal bus 116(m) represents a communication pathway for the distributor 112 to distribute requests received via input bus 108(m) to the sequencer 114(1). Likewise, internal bus 118(1) represents a communication pathway for the distributor 112 to distribute requests received via input bus 108(1) to sequencer 114(m) and internal bus 118(m) represents a communication pathway for the distributor 112 to distribute requests received via input bus 108(m) to the sequencer 114(m).

Each sequencer 114 includes m different buffers, which are individually linked to a corresponding one of the m different internal busses connecting the distributor 112 to the sequencer 114. For instance, sequencer 114(1) includes m different buffers 120, where buffer 120(1) receives requests distributed to sequencer 114(1) via internal bus 116(1) and buffer 120(m) receives requests distributed to sequencer 114(1) via internal bus 116(m). In a similar manner, sequencer 114(m) includes m different buffers 122, where buffer 122(1) receives requests distributed to sequencer 114(m) via internal bus 118(1) and buffer 122(m) receives requests distributed to sequencer 114(m) via internal bus 118(m). In accordance with one or more implementations, each of the m different buffers included in a sequencer 114 is configured as a FIFO buffer.

Each sequencer 114 of the distribution system 102 further includes a multiplexer, which represents functionality of the sequencer 114 to select which one of the buffers within the sequencer 114 should be selected to push stored data into a memory module of the distribution system 102 linked to the sequencer 114. With respect to the illustrated example of FIG. 1, sequencer 114(1) includes multiplexer 124 and sequencer 114(m) includes multiplexer 126. The multiplexer 124 is configured to select which buffer 120 within sequencer 114(1) should be selected to push stored data (e.g., a stored one of the read and write requests 104) into a memory module 128 linked to the sequencer 114(1) (e.g., memory module 128(1)). Similarly, the multiplexer 126 is configured to select which buffer 122 within sequencer 114(m) should be selected to push stored data into the memory module 128(m) linked to sequencer 114(m). In implementations, a sequencer 114 multiplexer (e.g., multiplexer 124 and multiplexer 126) follow a round robin format pattern by first selecting from an initial buffer (e.g., buffer 120(1) and buffer 122(1)), and progressing incrementally towards a final buffer (e.g., buffer 120(m) and buffer 122(m), then returning to the initial buffer and repeating the round robin format pattern.

Data selected by the multiplexer of a sequencer 114 is output to a corresponding memory module 128 as "request writes" in the illustrated example of FIG. 1. For instance, multiplexer 124 selects data from buffers 120 and writes the selected data to memory module 128(1) via request writes 130. Similarly, multiplexer 126 selects data from buffers 122 and writes the selected data to memory module 128(m) via request writes 132. In one or more implementations, each memory module 128 represents a printed circuit board on which one or more memory integrated circuits are mounted.

Each memory module 128 of the distribution system 102 represents a memory module having a single read port and a single write port. For instance, in some implementations, each memory module 128 is representative of a SRAM storage device. Alternatively or additionally, individual ones of the m different memory modules 128 are configured as DRAM modules, SDRAM modules, flash memory modules, combinations thereof, and so forth. Each memory module 128 includes v different linked lists, where v represents an integer greater than or equal to two, and corresponds to a number of different virtual channels associated with the read and write requests 104. Each linked list for a memory module 128 represents a sequence by which requests associated with a given virtual channel should be serviced in a credited protocol and represents data describing an order with which read and write requests 104 associated with the given virtual channel were written to the memory module 128.

For instance, memory module 128(1) includes v different linked lists 134, which individually describe an order of the request writes 130 for a corresponding virtual channel. Memory module 128(m) includes v different linked lists 136, which individually describe an order of the request writes 132 for a corresponding virtual channel. By including linked lists for each of v different virtual channels, the memory modules 128 of the distribution system 102 enable retrieval of virtual channel data for one virtual channel out of order with respect to a different virtual channel. As a specific example, if the distribution system 102 receives read and write requests 104 in the order of virtual channel one, then virtual channel two, then virtual channel three, the linked lists enable output of the read and write accesses 106 in any order, such as virtual channel three, then virtual channel one, then virtual channel two.

The distribution system 102 further includes a virtual channel arbiter and crossover multiplexer 138, which represents functionality of the distribution system 102 to pull data from the different memory modules 128 for output as the read and write accesses 106. The virtual channel arbiter and crossover multiplexer 138 represents logic of the distribution system 102 to service read and write requests 104 associated with a given virtual channel according to a defined pattern (e.g., left to right). As a specific example, in an implementation where the distribution system 102 is configured with two different memory modules 128, the virtual channel arbiter and crossover multiplexer 138 outputs read and write accesses 106, for a given virtual channel, by first selecting from a left memory module, then a right memory module, then the left memory module, then the right memory module, and so forth. This defined pattern is followed for each virtual channel, such that read and write requests 104 associated with a given virtual channel are granted in a proper sequence for the given virtual channel and can be granted independent of an order in which read and write requests 104 associated with different virtual channels are granted.

Having considered an example architecture of the distribution system 102, consider now a specific configuration of the distribution system 102 in accordance with one or more implementations and example of how the specific configuration of the distribution system 102 handles different input patterns of read and write requests 104.

Figure 2:
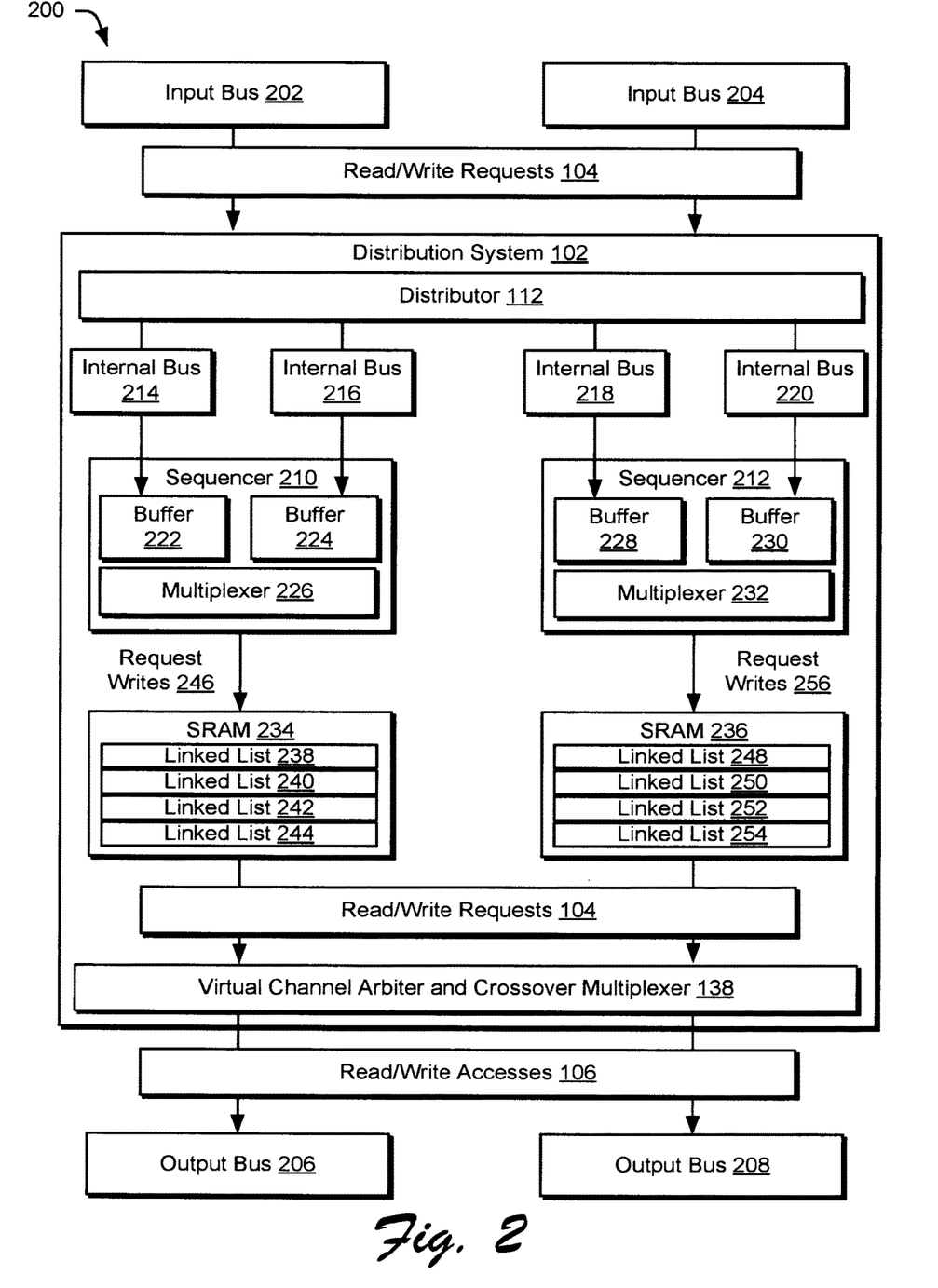
FIG. 2 illustrates an example depicting functionality of the distribution system handling requests for four different virtual channels via two data busses.

FIG. 2 illustrates an example 200 depicting functionality of the distribution system 102 handling requests associated with four different virtual channels that are communicated over two data busses.

In the illustrated example 200, the distribution system 102 receives read and write requests 104 via input bus 202 and input bus 204. The distribution system 102 is further configured to grant at least some of the read and write requests 104 as read and write accesses 106 via output bus 206 and output bus 208. In at least one implementation, output bus 206 represents a continuation of input bus 202 and output bus 208 represents a continuation of input bus 204. Based on the two input busses via which the read and write requests 104 are received, the distribution system 102 includes two different sequencers: sequencer 210 and sequencer 212. The distributor 112 is configured to allocate requests received via input bus 202 to sequencer 210 via internal bus 214 and allocate requests received via input bus 204 to sequencer 210 via internal bus 216. The distributor 112 is further configured to allocate requests received via input bus 202 to sequencer 212 via internal bus 218 and allocate requests received via input bus 204 to sequencer 212 via internal bus 220.

Each sequencer of the distribution system 102 in the illustrated example 200 includes two buffers and a multiplexer. For instance, sequencer 210 includes buffer 222, buffer 224, and multiplexer 226. Sequencer 212 includes buffer 228, buffer 230, and multiplexer 232. The respective internal busses of the distribution system 102 are directly connected to a respective one of the sequencer buffers. For instance, internal bus 214 connects the distributor 112 to buffer 222, internal bus 216 connects the distributor 112 to buffer 224, internal bus 218 connects the distributor 112 to buffer 228, and internal bus 220 connects the distributor 112 to buffer 230. As noted above with respect to FIG. 1 and described in further detail below with respect to FIGS. 3 and 4, the distributor 112 represents logic that causes sending of sequential read and write requests 104, for a given virtual channel, to different ones of the sequencer 210 and sequencer 212. For instance, a first request associated with a virtual channel is distributed to the sequencer 210, while a second request associated with the virtual channel is distributed to sequencer 212, a third request associated with the virtual channel is distributed to sequencer 210, and so forth.

Each sequencer multiplexer (e.g., multiplexer 226 and multiplexer 232) is configured to select stored data from its sequencer's buffers for output to a memory module linked to the sequencer. In the illustrated example of FIG. 2, sequencer 210 is linked to SRAM 234 and sequencer 212 is linked to SRAM 236. As noted above, the illustrated example 200 depicts an implementation where the read and write requests 104 are associated with four different virtual channels. Accordingly, the SRAM 234 and the SRAM 236 each include four different linked lists-one to describe an ordering of requests associated with a respective one of the four different virtual channels as stored in the SRAM.

Specifically, SRAM 234 includes linked list 238, linked list 240, linked list 242, and linked list 244. The linked list 238 stores information describing an ordering of request writes 246 output by the multiplexer 226 that are associated with a first virtual channel, linked list 240 describes an ordering of requests for a second virtual channel, linked list 242 describes an ordering of requests for a third virtual channel, and linked list 244 describes an ordering of requests for a fourth virtual channel.

In a similar manner, SRAM 236 includes linked list 248, linked list 250, linked list 252, and linked list 254. The linked list 248 stores information describing an ordering of request writes 256 output by the multiplexer 232 that are associated with the first virtual channel, linked list 250 describes an ordering of requests for the second virtual channel, linked list 252 describes an ordering of requests for the third virtual channel, and linked list 254 describes an ordering of requests for the fourth virtual channel.

Having considered an example architecture of the distribution system 102 for handling requests associated with four different virtual channels that are communicated over two data busses, consider now examples of how the distribution system 102 handles different virtual channel patterns of read and write requests 104.

Figure 3:
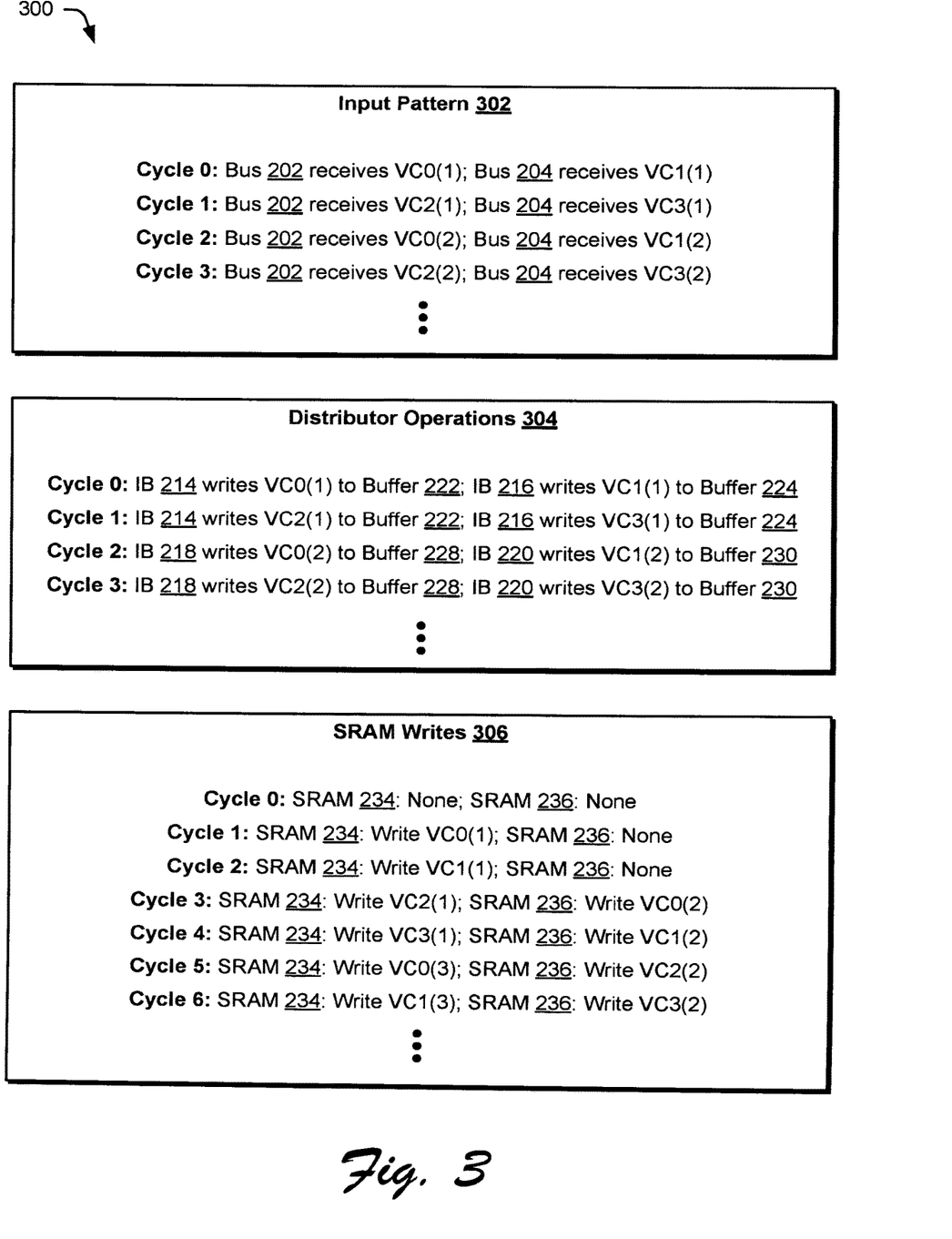
FIG. 3 illustrates an example virtual channel request input pattern and operations performed as part of distributing requests from the example virtual channel request input pattern among multiple memory modules.

FIG. 3 illustrates an example 300 of a virtual channel request input pattern and operations performed by the distribution system 102 configured according to the illustrated example of FIG. 2.

The illustrated example 300 depicts an input pattern 302 that describes how different ones of the read and write requests 104 are received by the distribution system 102 via the input bus 202 and the input bus 204 over different clock cycles. For instance, the input pattern 302 describes that during an initial cycle ("Cycle zero"), input bus 202 receives an initial request assigned to virtual channel zero (VC0(1)) and input bus 204 receives an initial request assigned to virtual channel one (VC1(1)). During a second clock cycle ("Cycle one"), input bus 202 receives an initial request assigned to virtual channel two (VC2(1)) and input bus 204 receives an initial request assigned to virtual channel three (VC3(1)). During a third clock cycle ("Cycle two"), input bus 202 receives a second request assigned to virtual channel zero (VC0(2)) and input bus 204 receives a second request assigned to virtual channel one (VC1(2)). During a fourth clock cycle ("Cycle three"), input bus 202 receives a second request assigned to virtual channel two (VC2(2)) and input bus 204 receives a second request assigned to virtual channel three (VC3(2)). This input pattern 302 continues, as indicated by the ellipses below cycle three.

The example 300 further includes a set of distributor operations 304, which describe how the distributor 112 of FIG. 2 reacts to the input pattern 302. As noted above, the virtual channel allocation logic of the distributor 112 causes sending of initial traffic (e.g., an initial one of the read and write requests 104) associated with a virtual channel to an initial sequencer of the distribution system 102 (e.g., sequencer 210). The virtual channel allocation logic of the distributor 112 then sends subsequent instances of traffic associated with the virtual channel to different sequencer (e.g., sequencer 212), repeating this allocation pattern among sequencers in a round robin format.

Specifically, the distributor operations 304 describe how, during cycle zero, the distributor 112 writes VC0(1) to buffer 222 via internal bus 214 and writes VC1(1) to buffer 224 via internal bus 216. During cycle one, the distributor 112 writes VC2(1) to buffer 222 via internal bus 214 and writes VC3(1) to buffer 224 via internal bus 216. These first two cycles represent how the distributor 112 distributes initial instances of requests assigned to each virtual channel to an initial sequencer (e.g., sequencer 210).

During cycles in which the distributor 112 receives a subsequent instance of a request associated with a virtual channel that was previously assigned to sequencer 210, the distributor 112 assigns the subsequent instance of the request to sequencer 212. For example, distributor operations 304 describe how, during cycle two, VC0(2) is written to buffer 228 via internal bus 218 and VC1(2) is written to buffer 230 via internal bus 220. During cycle three, VC2(2) is written to buffer 228 via internal bus 218 and VC3(2) is written to buffer 230 via internal bus 220. These distributor operations 304 continue for subsequent cycles of the input pattern 302, as represented by the ellipses below cycle three.

Finally, the example 300 includes a set of SRAM writes 306, which describe how virtual channel requests are pulled from the sequencer 210 and the sequencer 212 for writing to the SRAM 234 and the SRAM 236. Each sequencer multiplexer (e.g., multiplexer 226 of sequencer 210 and multiplexer 232 of sequencer 212) pulls data from buffers of the sequencer in a round-robin manner, beginning with a buffer to which data was first written (e.g., buffer 222 or buffer 228).

During cycle zero, no SRAM writes occur, as the distribution system 102 is busy writing initial requests to buffers of the sequencer 210 and the sequencer 212.

During cycle one, VC0(1) is written to SRAM 234 from buffer 222. No data is written to SRAM 236 during cycle one, as no read and write requests 104 have yet been distributed to sequencer 212. During cycle two, VC1(1) is written to SRAM 234 from buffer 224 and no data is written to SRAM 236. During cycle three, VC2(1) is written to SRAM 234 from buffer 222 and VC0(2) is written to SRAM 236 from buffer 228. During cycle four, VC3(1) is written to SRAM 234 from buffer 224 and VC1(2) is written to SRAM 236 from buffer 230. During cycle five, VC0(3) (received during a subsequent cycle not depicted in input pattern 302) is written to SRAM 234 and VC2(2) is written to SRAM 236 from buffer 228. During cycle six, VC1(3) (received during a subsequent cycle not depicted in input pattern 302) is written to SRAM 234 and VC3(2) is written to SRAM 236 from buffer 230.

Respective linked lists of SRAM 234 and SRAM 236 are updated during the SRAM writes 306, such that virtual channel requests stored in each SRAM are sequentially granted as read and write accesses 106, relative to one another. As a specific example where linked list 238 corresponds to virtual channel zero (VC0), linked list 238 describes that a correct sequence for the virtual channel as stored in SRAM 234 is VC0(1) followed by VC0(3). Thus, the linked lists of each memory module in the distribution system 102, together with logic of the multiplexer 138 that forces granting of sequential read and write accesses 106 for a given virtual channel from different memory modules, ensures that virtual channel requests are granted in a correct sequence that is not constrained by requests of one or more other virtual channels.

Figure 4:
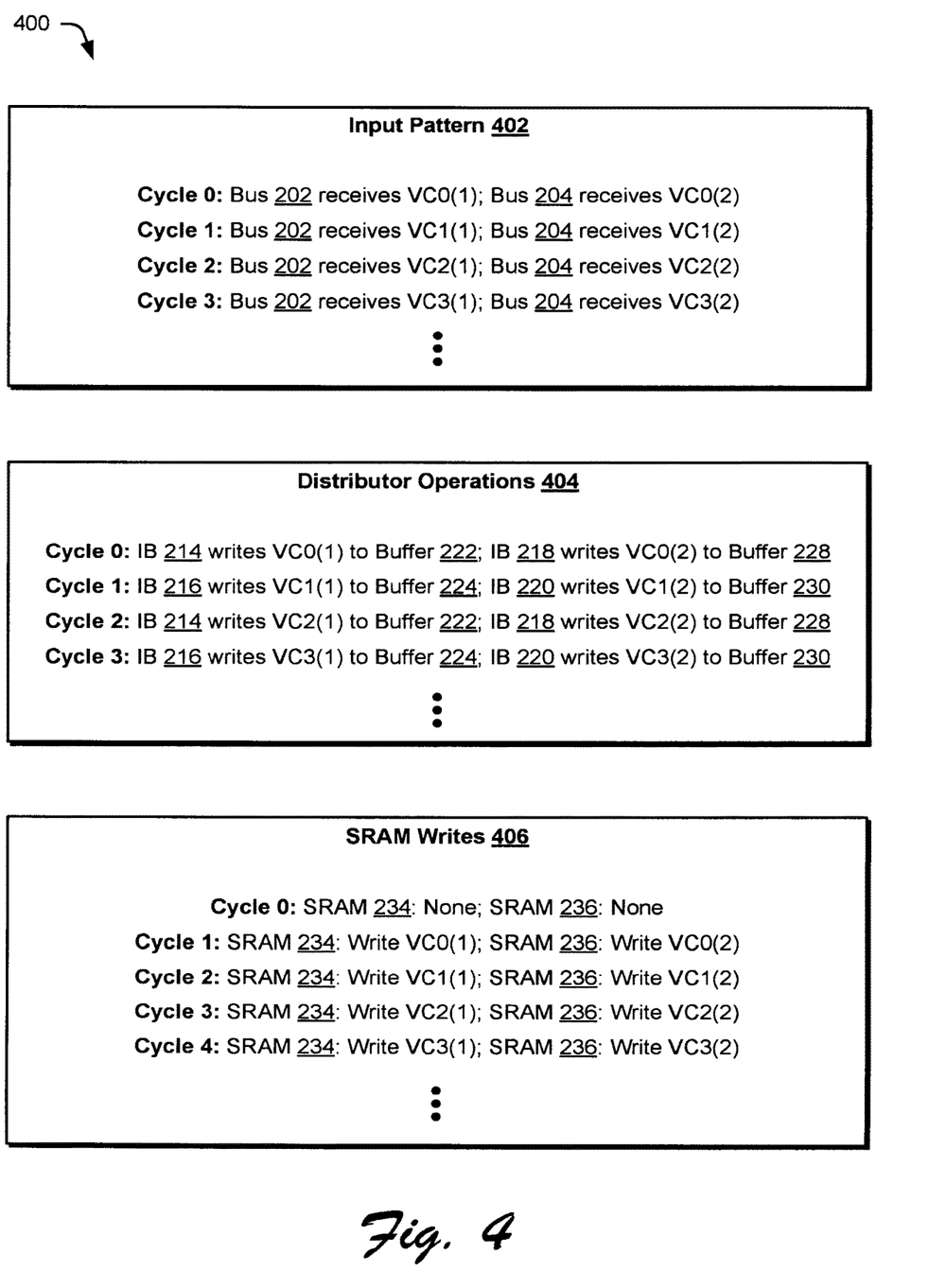
FIG. 4 illustrates a different example virtual channel request input pattern and operations performed as part of distributing requests from the different example virtual channel request input pattern.

FIG. 4 illustrates an example 400 of a different virtual channel request input pattern (e.g., relative to the example 300) and operations performed by the distribution system 102 configured according to the illustrated example of FIG. 2.

The illustrated example 400 depicts an input pattern 402 that describes how different ones of the read and write requests 104 are received by the distribution system 102 via the input bus 202 and the input bus 204 over different clock cycles. For instance, the input pattern 402 describes that during an initial cycle ("Cycle zero"), input bus 202 receives an initial request assigned to virtual channel zero (VC0(1)) and input bus 204 receives a second request assigned to virtual channel zero (VC0(2)). In implementations, because the different requests assigned to a common virtual channel (e.g., VC0) are received during a single clock cycle, the distribution system 102 assigns an ordering based on a communication channel via which the requests were received. For instance, during a given clock cycle, a request received via input bus 202 is considered to be ordered before a request received via input bus 204. Different input bus orderings are usable without departing from the spirit of the described techniques and the example of FIG. 4 merely represents one possible request ordering.

During a second clock cycle ("Cycle one"), input bus 202 receives an initial request assigned to virtual channel one (VC1(1)) and input bus 204 receives a second request assigned to virtual channel one (VC1(2)). During a third clock cycle ("Cycle two"), input bus 202 receives an initial request assigned to virtual channel two (VC2(1)) and input bus 204 receives a second request assigned to virtual channel two (VC2(2)). During a fourth clock cycle ("Cycle three"), input bus 202 receives an initial request assigned to virtual channel three (VC3(1)) and input bus 204 receives a second request assigned to virtual channel three (VC3(2)). This input pattern 402 continues, as indicated by the ellipses below cycle three.

The example 400 further includes a set of distributor operations 404, which describe how the distributor 112 of FIG. 2 reacts to the input pattern 402. As noted above, the virtual channel allocation logic of the distributor 112 causes sending of initial traffic (e.g., an initial one of the read and write requests 104) associated with a virtual channel to an initial sequencer of the distribution system 102 (e.g., sequencer 210). The virtual channel allocation logic of the distributor 112 then sends subsequent instances of traffic associated with the virtual channel to different sequencer (e.g., sequencer 212), repeating this allocation pattern among sequencers in a round robin format.

Specifically, the distributor operations 404 describe how, during cycle zero, the distributor 112 writes VC0(1) to buffer 222 via internal bus 214 and writes VC0(2) to buffer 228 via internal bus 218. This initial cycle represents how the distributor 112 distributes an initial request associated with a given virtual channel to an initial sequencer (e.g., sequencer 210) and a subsequent request associated with the given virtual channel to a different sequencer than the initial sequencer (e.g., sequencer 212).

During cycle one, the distributor 112 writes VC1(1) to buffer 224 via internal bus 216 and writes VC1(2) to buffer 230 via internal bus 220. During cycle 2, the distributor 112 writes VC2(1) to buffer 222 via internal bus 214 and writes VC2(2) to buffer 228 via internal bus 218. During cycle three, the distributor 112 writes VC3(1) to buffer 224 via internal bus 216 and writes VC3(2) to buffer 230 via internal bus 220. These distributor operations 404 continue for subsequent cycles of the input pattern 402, as represented by the ellipses below cycle three.

Finally, the example 400 includes a set of SRAM writes 406, which describe how virtual channel requests are pulled from the sequencer 210 and the sequencer 212 for writing to the SRAM 234 and the SRAM 236. Each sequencer multiplexer (e.g., multiplexer 226 of sequencer 210 and multiplexer 232 of sequencer 212) pulls data from buffers of the sequencer in a round-robin manner, beginning with a buffer to which data was first written (e.g., buffer 222 or buffer 228).

During cycle zero, no SRAM writes occur, as the distribution system 102 is busy writing initial requests to buffers of the sequencer 210 and the sequencer 212. During cycle one, VC0(1) is written to SRAM 234 via buffer 222 and VC0(2) is written to SRAM 236 via buffer 228. During cycle two, VC1(1) is written to SRAM 234 via buffer 224 and VC1(2) is written to SRAM 236 via buffer 230. During cycle three, VC2(1) is written to SRAM 234 via buffer 222 and VC2(2) is written to SRAM 236 via buffer 228. During cycle four, VC3(1) is written to SRAM 234 via buffer 224 and VC3(2) is written to SRAM 236 via buffer 230.

Respective linked lists of SRAM 234 and SRAM 236 are updated during the SRAM writes 406, such that virtual channel requests stored in each SRAM are sequentially granted as read and write accesses 106, relative to one another. Thus, the linked lists of each memory module in the distribution system 102, together with logic of the multiplexer 138 that forces granting of sequential read and write accesses 106 for a given virtual channel from different memory modules, ensures that virtual channel requests are granted in a correct sequence that is not constrained by requests of one or more other virtual channels.

The following discussion describes techniques that are implemented utilizing the previously described systems and devices. Aspects of the procedures are implemented in hardware, firmware, software, or a combination thereof. The procedures are shown as a set of blocks that specify operations performed by one or more devices and are not necessarily limited to the orders shown for performing the operations by the respective blocks. Furthermore, although various operations performed by one or more devices are recited, the techniques discussed herein additionally or alternatively include additional operations. In portions of the following discussion, reference is made to FIGS. 1-4.

Figure 5:
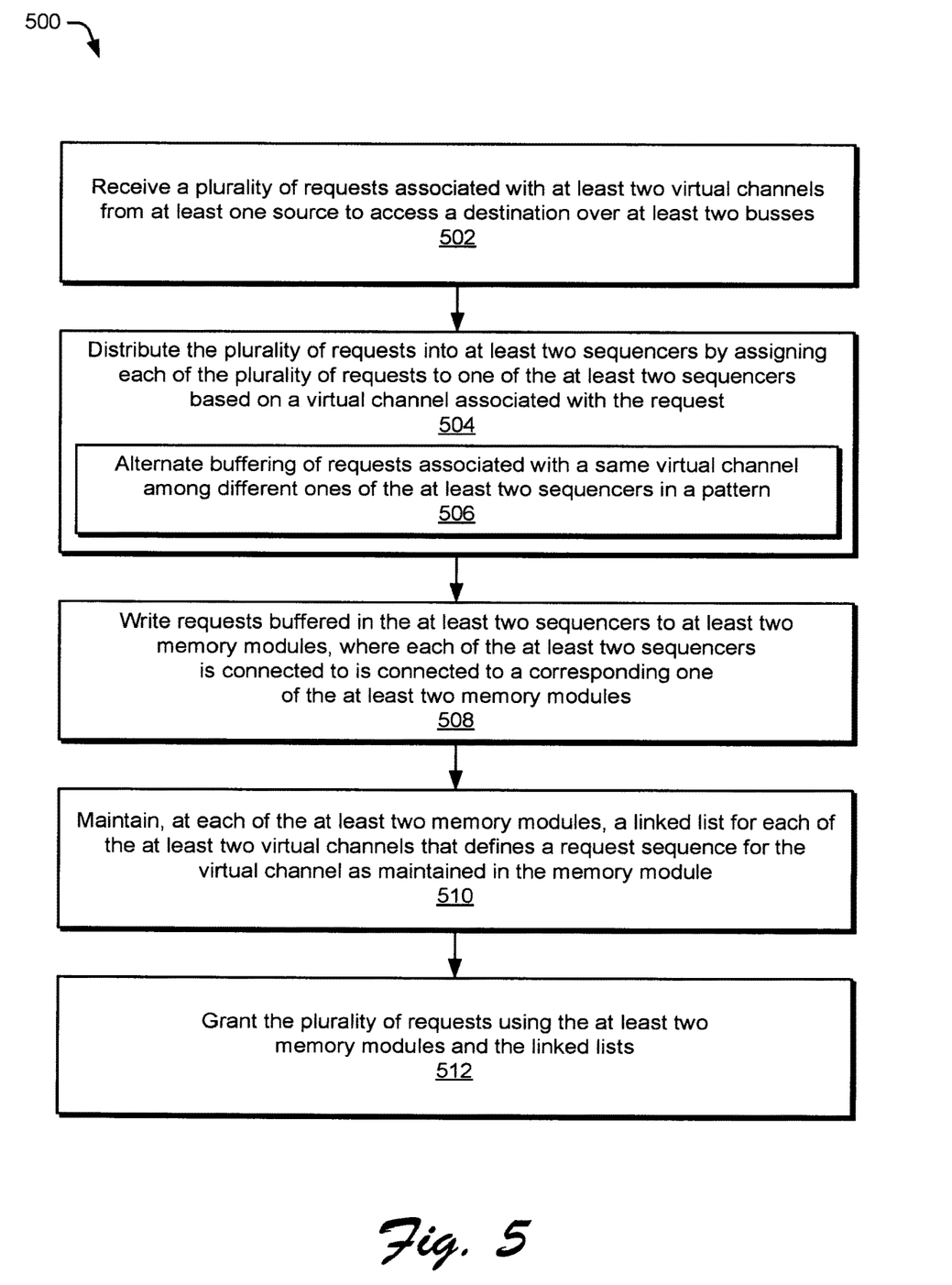
FIG. 5 is a flow diagram depicting a procedure in an example implementation of distributing requests associated with different virtual channels.

FIG. 5 is a flow diagram depicting a procedure 500 in an example implementation of distributing requests associated with different virtual channels.

A plurality of request associated with at least two virtual channels to access a destination are received from at least one source over at least two busses (block 502). The distribution system 102, for instance, receives read and write requests 104 from at least one source via m different input busses 108, where m represents any integer greater than or equal to two. Each of the read and write requests 104 are received with an indication of a virtual channel, of at least two different virtual channels, with which the request is associated.

The plurality of requests are distributed into at least two sequencers by assigning each of the plurality of requests to one of the at least two sequencers based on a virtual channel associated with the request (block 504). The distributor 112, for instance, distributes an initial request for each of the at least two different virtual channels to sequencer 114(1). As a specific example, the distributor 112 assigns VC0(1), VC1(1), VC2(1), and VC3(1), received as part of either input pattern 302 or input pattern 402, to the sequencer 210.

As part of distributing the plurality of requests into the at least two sequencers, buffering of requests associated with a same virtual channel are alternated among different ones of the at least two sequencers in a pattern (block 506). The distributor 112, for instance, after distributing an initial request for a virtual channel to a buffer of a first sequencer (e.g., sequencer 114(1) or sequencer 210), distributes a subsequent request (e.g., a second request) for the virtual channel to a buffer of a second sequencer (e.g., sequencer 114(m) or sequencer 212). The distributor 112 follows this pattern in a round robin format, buffering requests for a given virtual channel at sequencers 114 [1: m] one at a time, returning to sequencer 114(1) after buffering a request at sequencer 114(m).

Requests buffered in the at least two sequencers are then written to at least two memory modules, where each of the at least two sequencers is connected to a corresponding one of the at least two memory modules (block 508). The multiplexer 226 of sequencer 210, for instance, writes requests stored in buffer 222 and buffer 224 to SRAM 234, represented as request writes 246 in the illustrated example of FIG. 2. The multiplexer 232 of sequencer 212 similarly writes requests stored in buffer 228 and buffer 230 to SRAM 236, represented as request writes 256 in the illustrated example of FIG. 2.

A linked list for each of the at least two virtual channels is maintained at each of the at least two memory modules, where each linked list defines a request sequence for the virtual channel as maintained in the memory module (block 510). The SRAM 234, for instance, maintains linked list 238, linked list 240, linked list 242, and linked list 244, which describe orders in which requests associated with first, second, third, and fourth virtual channels, respectively, were written to SRAM 234 by the multiplexer 226. Similarly, SRAM 236 maintains linked list 248, linked list 250, linked list 252, and linked list 254, which describe orders in which requests associated with first, second, third, and fourth virtual channels, respectively, were written to SRAM 236 by the multiplexer 232.

The plurality of requests are then granted using the at least two memory modules and the linked lists (block 512). The multiplexer 138, for instance, grants read and write requests 104 as read and write accesses 106 via m different output busses 110. To do so, the multiplexer 138 grants requests associated with a given virtual channel by first pulling data from an initial memory module (e.g., pulling VC0(1) from SRAM 234) and pulling a subsequent instance of data associated with the given virtual channel from a subsequent memory module (e.g., pulling VC0(2) from SRAM 236). The multiplexer 138 follows this pattern in a round robin format, granting requests for a given virtual channel by pulling data from different memory modules 128 [1: m] one at a time, returning to memory module 128(1) after granting a request using data pulled form memory module 128(m).

Figure 6:
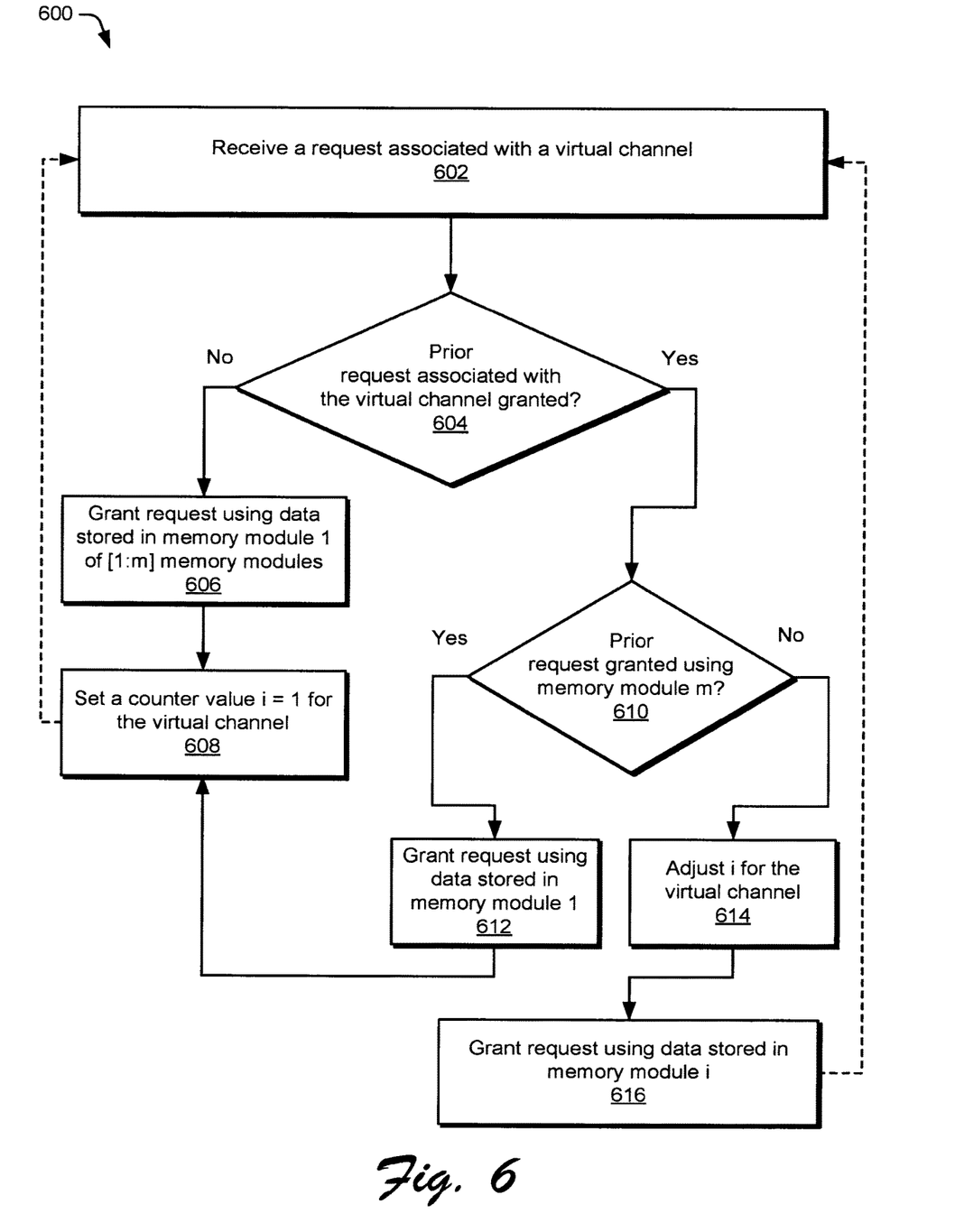
FIG. 6 is a flow diagram depicting a procedure in an example implementation of cycling through different memory modules to grant requests associated with different virtual channels.

FIG. 6 is a flow diagram depicting a procedure 600 in an example implementation of cycling through different memory modules to grant requests associated with different virtual channels.

A request associated with a virtual channel is received (block 602). The distribution system 102, for instance, receives a read and write request 104 associated with a virtual channel. The distribution system 102 distributes the read and write request 104 into one of m different memory modules, such as one of memory modules 128 depicted in FIG. 1, according to the procedure 500.

A determination is then made as to whether a prior request associated with the virtual channel has been granted (block 604). The virtual channel arbiter and crossover multiplexer 138, for instance, keeps track of granted read and write accesses 106 to identify whether the read and write request 104 associated with the virtual channel is an initial request for the virtual channel or if a prior request for the virtual channel has been granted by the distribution system 102.

In response to identifying that the request associated with the virtual channel is an initial request (e.g., a "No" determination at block 604), the request is granted using data stored in memory module one of [1: m] memory modules (block 606). The virtual channel arbiter and crossover multiplexer 138, for instance, grants the request as one of the read and write accesses 106 using data stored in SRAM 234. After granting the request using data stored in memory module one, a counter value i for the virtual channel is assigned a value of one (block 608). The virtual channel arbiter and crossover multiplexer 138, for instance, maintains a counter value i for each virtual channel and assigns the counter value i for VC0 after granting request VC0(1). Operation then optionally returns to block 602 to receive additional requests, as indicated by the dashed arrow returning to block 602 from block 608.

Alternatively, in response to identifying that the request associated with the virtual channel is not an initial request (e.g., a "Yes" determination at block 604), a determination is made as to whether the prior request for the virtual channel was granted using memory module m (block 610). The virtual channel arbiter and crossover multiplexer 138, for instance, checks the counter value i for the virtual channel to identify whether i=m. In response to identifying that the last-granted request for the virtual channel was granted using data retrieved from memory module m (e.g., a "Yes" determination at block 610), the request is granted using data stored in memory module one (block 612) and operation of procedure 600 returns to block 608 (e.g., where the previous counter value of m is adjusted to create an adjusted counter value of i=1.

Alternatively, in response to identifying that the last-granted request for the virtual channel was granted using a memory module other than memory module m (e.g., a "No" determination at block 610), the counter value i for the virtual channel is adjusted to create an adjusted counter value (block 614). The virtual channel arbiter and crossover multiplexer 138, for instance, increments the counter value i for the virtual channel by one. After incrementing the counter value i for the virtual channel, the request is granted using data stored in memory module i (block 616). For instance, in an example scenario where SRAM 234 corresponds to a counter value of one and SRAM 236 corresponds to a counter value of two, after incrementing the counter value for the virtual channel from one to two, the virtual channel arbiter and crossover multiplexer 138 grants the request as one of the read and write accesses 106 using data stored in SRAM 236. Operation then optionally returns to block 602 to receive additional requests, as indicated by the dashed arrow returning to block 602 from block 616.

Although features and elements are described above in particular combinations, each feature or element is usable alone without the other features and elements or in various combinations with or without other features and elements. In this manner, many variations are possible based on the disclosure herein.

The various functional units illustrated in the figures and/or described herein (including, where appropriate, the distribution system 102, the distributor 112, the sequencer 114, and the memory module 128) are implemented in any of a variety of different manners such as hardware circuitry, software executing or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
   at least two physical communication channels;
   at least two memory devices;
   a distributor to receive a plurality of requests, that are associated with multiple different virtual channels, via the at least two physical communication channels;
   at least two sequencers to buffer the plurality of requests before writing the plurality of requests to the at least two memory devices, each of the at least two sequencers communicatively coupled to a respective one of the at least two memory devices and configured to write a single one of the plurality of requests to the respective one of the at least two memory devices during a system cycle; and
   an arbiter to grant release of the plurality of requests from the at least two memory devices according to a defined pattern.

2. The system of claim 1, wherein the at least two physical communication channels connect the distributor to a source from which the plurality of requests are received.

3. The system of claim 1, wherein each sequencer of the at least two sequencers includes at least two buffers, wherein each of the at least two buffers corresponds to a respective one of the at least two physical communication channels.

4. The system of claim 3, wherein each sequencer of the at least two sequencers includes a multiplexer that writes requests from the at least two buffers of the sequencer to the respective one of the at least two memory devices.

5. The system of claim 1, wherein the distributor is configured to assign sequential requests of the plurality of requests that are associated with a common virtual channel of the multiple different virtual channels to different ones of the at least two sequencers based on a defined pattern.

6. The system of claim 1, wherein the distributor is configured to receive one of the plurality of requests via each of the at least two physical communication channels during the system cycle.

7. The system of claim 1, wherein the arbiter is further configured to release a credit to a source from which the plurality of requests are received in response to granting each of the plurality of requests.

8. The system of claim 1, wherein the plurality of requests are received responsive to the system informing a source from which the plurality of requests are received as to a number of available credits, wherein the number of available credits is equal to a number of requests that fill the at least two memory devices.

9. The system of claim 1, wherein each of the at least two memory devices includes, for each of the multiple different virtual channels, a linked list that describes an order in which requests associated with a corresponding one of the multiple different virtual channels were written to the memory device.

10. A method comprising:
    receiving a plurality of requests associated with at least two virtual channels;
    distributing the plurality of requests into at least two sequencers of a distribution system by assigning each of the plurality of requests to one of the at least two sequencers based a virtual channel of the at least two virtual channels that is associated with the request;
    writing requests stored in the at least two sequencers to at least two memory devices, each of the at least two sequencers communicatively coupled to a respective one of the at least two memory devices and configured to write a single one of the requests stored in the at least two sequencers to the respective one of the at least two memory devices during a system cycle;
    maintaining, at each of the at least two memory devices, a plurality of linked lists, the plurality of linked lists including a linked list for each of the at least two virtual channels; and
    granting the plurality of requests using the at least two memory devices and the plurality of linked lists of each of the at least two memory devices.

11. The method of claim 10, wherein distributing the plurality of requests into the at least two sequencers comprises alternating buffering of requests that are associated with a same virtual channel of the at least two virtual channels among different ones of the at least two sequencers based on a pattern.

12. The method of claim 11, wherein the pattern specifies an ordering of the at least two sequencers and causes distribution of sequential ones of the requests that are associated with the same virtual channel based on the ordering in a round robin format.

13. The method of claim 10, wherein each linked list of the plurality of linked lists defines an ordering in which requests of the plurality of requests, that are associated with a virtual channel identified by the linked list, were written to a corresponding one of the at least two memory devices.

14. A device comprising:
a distributor configured to:
receive a request associated with a virtual channel;
identify that a prior request associated with the virtual channel has been granted;
identify a counter value maintained for the virtual channel;
grant the request using data stored in a memory device of a plurality of memory devices, each of the plurality of memory devices connected to the distributor via a respective single communication channel and configured to service a single request during a single clock cycle, wherein the distributor identifies the memory device based on the counter value;
create an adjusted counter value by changing the counter value responsive to granting the request;
receive an additional request associated with the virtual channel; and
grant the additional request using data stored in a different memory device of the plurality of memory devices, the different memory device identified based on the adjusted counter value.

15. The device of claim 14, wherein the distributor is configured to assign the request and the additional request to a sequencer linked to the memory device or a different sequencer linked to the different memory device based on a defined pattern.

16. The device of claim 14, wherein the distributor receives the request and the additional request during a single clock cycle of the device.

17. The device of claim 14, wherein the memory device and the different memory device each include a linked list for the virtual channel that describes an order in which requests associated with the virtual channel are written.

18. The device of claim 14, wherein the request and the additional request are received in response to the distributor informing a request source of a number of available credits, wherein the number of available credits comprises a number of requests that fill the memory device and the different memory device.

19. The device of claim 14, wherein the distributor is further configured to release a credit to a request source in response to granting the request.

20. The device of claim 14, wherein each of the plurality of memory devices is communicatively coupled to a respective one of a plurality of sequencers, each of the plurality of sequencers including at least two buffers, wherein each of the at least two buffers corresponds to a respective one of at least two physical communication channels from which the distributor receives requests.

* * * * *